United States Patent [19]
Ueyama

[11] Patent Number: 6,002,534
[45] Date of Patent: Dec. 14, 1999

[54] OPTICAL APPARATUS WITH TWO OPTICAL SYSTEMS AND METHOD FOR MOVING THE TWO OPTICAL SYSTEMS

[75] Inventor: Masayuki Ueyama, Takarazuka, Japan

[73] Assignee: Minolta Co., Ltd., Osaka, Japan

[21] Appl. No.: 09/056,060

[22] Filed: Apr. 7, 1998

[30] Foreign Application Priority Data

Apr. 9, 1997 [JP] Japan ..................................... 9-090772
Apr. 9, 1997 [JP] Japan ..................................... 9-090782

[51] Int. Cl.⁶ .............................................. G02B 7/02
[52] U.S. Cl. ............................................. 359/824; 359/823
[58] Field of Search ................................... 359/824, 814, 359/823

[56] References Cited

U.S. PATENT DOCUMENTS 5,589,723  12/1996  Yoshida et al. ......................... 310/328
5,828,503  10/1998  Kaneda et al. .......................... 359/824

FOREIGN PATENT DOCUMENTS 08304943  11/1996  Japan .

*Primary Examiner*—Hung Xuan Dang
*Attorney, Agent, or Firm*—Burns, Doane, Swecker & Mathis, LLP

[57] ABSTRACT

A stereoscopic optical device with a simple mechanism and a thinner dimension in a direction which corresponds to a diametrical direction of a lens group accommodated therein. On a fixing plate, a plurality of movable plates each of which supports a pair of lens groups on both sides thereof along an optical axis respectively, put one over the other, in which the movable plates are slidably moved to each other and to the fixing plate through a cam mechanism for a zooming operation. A total thickness of the plurality of movable plates and the fixing plate, is designed to be approximately equal to or less than a diameter of the lens group.

16 Claims, 5 Drawing Sheets

OPTICAL APPARATUS WITH TWO OPTICAL SYSTEMS AND METHOD FOR MOVING THE TWO OPTICAL SYSTEMS

This application is based upon applications Nos. 9-90772 and 9-90782 filed in Japan, the contents of which are hereby incorporated by reference.

BACKGROUND OF THE INVENTION

1. Field of the Invention

The present invention generally relates to an optical apparatus which has a pair of optical systems and to a method for moving the pair of optical systems, and particularly relates to the optical apparatus which is preferably used for a stereoscopic camera, binoculars, etc., and to the method for moving the pair of optical systems along a pair of optical axes thereof.

2. Description of the Related Arts

Conventionally, there has been provided a stereoscopic camera, binoculars, or the like, as an optical apparatus, which has a pair of optical systems that are separate from each other. According to the conventional optical apparatus, one optical system thereof generally has a lens supporting mechanism for supporting a lens group, which is separate from a lens supporting mechanism of the other optical system thereof. That is, the lens supporting mechanism has a holder for holding the lens group, and members including a cam cylinder, a guide bar, etc. for guiding and moving the holder of the lens group, all arranged outside the lens group. Therefore, the lens supporting mechanism occupies a large radial space for mounting itself around the entire periphery of the lens group. Namely, the radial configuration of the lens supporting mechanism around the periphery of the lens group becomes large.

Meanwhile, in recent years, there has been a demand for supplying a thin type of video camera, or digital camera, which has a compact optical system and a compact lens supporting mechanism for supporting a lens group therein, accompanying a miniaturization of a photographing element, or an image taking element, in a field of the video camera or the digital camera.

However, the radial configuration of the conventional lens supporting mechanism around the periphery of the lens group is large. Therefore, it is difficult to make the lens supporting mechanism thinner as a whole.

On the other hand, a conventional stereoscopic camera generally has a pair of optical systems, for producing a pair of images of a subject, in which one of the optical systems is of the same type as that of the other thereof, and has a pair of image taking elements, for capturing the subject images of the subject which are gained by the pair of optical systems respectively, in which one of the image taking elements is of the same type as that of the other thereof.

The image captured by the one of the image taking elements is dislocated or deviated right and left from the image captured by the other thereof, because a direction in which the one of the image taking elements observes the subject is dislocated or deviated visually from a direction in which the other thereof observes the same subject. Due to this dislocation or deviation of the two images observed, a stereoscopic image is reproduced. Namely, a viewer can observe the subject stereoscopically, due to the dislocation or deviation of the subject images in the right and left direction.

From a physiological point of view, it is to be noted that a direction in which one eye of the viewer looks at an object is generally parallel with a direction in which the other eye of the viewer looks at the same object in case that the object is far away from the viewer, and that the directions are cast inward to each other in case that the object is not far away from the viewer.

The conventional stereoscopic camera, however, is generally so constructed that the pair of optical systems are oriented to each other at the same angle therebetween all the time. Therefore, for instance, there arises a problem that although the image of a distant subject gained when the viewer observes it gives him/her a natural three-dimensional effect, of the subject the image of a near subject gained when the viewer observes it gives him/her an unnatural three-dimensional effect thereof.

In order to solve this problem, it is possible to construct the two optical systems of the stereoscopic camera so that the relative orientation of the two optical systems thereof is changeable, depending upon a distance between the stereoscopic camera and the subject to be photographed or observed.

If, however, trying to design such optical systems, the optical systems become very complex; thus, it is impracticable.

SUMMARY OF THE INVENTION

Accordingly, it is an object of the present invention to provide an optical apparatus with a pair of optical systems, in which the dimension of the lens supporting mechanism thereof is reduced and thinner in one radial direction of the lens group being held by the lens supporting mechanism so that the optical apparatus becomes thinner in the radial direction.

It is another object of the present invention to provide a method for moving the pair of optical systems along the respective optical axes thereof in which the optical axis of one of the optical systems is parallel with the optical axis of the other thereof.

It is still another object of the present invention to provide the optical apparatus that is simple in construction, by which it is possible to gain a natural image of a subject, irrespective of the distance between the optical apparatus and the subject to be photographed or observed.

In accomplishing these and other objects of the present invention, in one aspect thereof, there is provided an optical apparatus with a pair of optical systems, comprising: a stationary plate which extends in a direction parallel to an optical axis; a plurality of movable plates which are put one over the other thereof, wherein the movable plates are slidable relative to each other and relative to the stationary plate, in the direction parallel to the optical axis; a drive device for moving each of the plurality of movable plates relative to the stationary plate by a predetermined distance in the direction parallel to the optical axis; a pair of lens supporting parts which project from both sides of each of the movable plates, wherein the lens supporting part supports a lens group; and a pair of optical systems which are provided on the both sides of the movable plates, wherein each of the pair of optical systems has a plurality of the lens groups.

In the mechanism, the pair of optical systems can be provided symmetrically relative to the movable plate.

In the mechanism, the stationary plate and each of the movable plates can be so constructed that a total thickness of the stationary plate and the movable plates is generally equal to or less than a diameter of the lens group. Namely, it is possible to construct the total thickness, in the direction perpendicular to the direction of the optical axis, of both the stationary plate and the movable plates, generally equal to or less than the diameter of the lens group.

Also, it is possible to construct the drive device and the lens supporting part so that the thickness thereof is generally equal to or less than the diameter of the lens group.

Namely, with the mechanism, there is provided an optical apparatus with a pair of optical systems, in which the dimension of the lens supporting mechanism thereof can be reduced and thinner, as much as possible, in one radial direction relative to the lens group being held by the lens supporting mechanism so that the optical apparatus has a thinner dimension in the one radial direction.

By the way, the lens supporting part can be erected from an edge, of the movable plate, which is parallel with the optical axis.

Alternatively, the lens supporting part can be erected from another edge or other parts, including a main surface, of the movable plate.

Preferably, the drive device comprises: a first driving device for moving one of the movable plates relative to the stationary plate in the direction parallel to the optical axis; and a second driving device for moving the other of the movable plates relative to the stationary plate in the direction of the optical axis, in linkage with the movement of the one of the movable plates, wherein each of the movable members has a cutout which extends centrally in the direction parallel to the optical axis, and wherein the first driving device is provided in the cutout of the movable member where the first driving device is supported by the stationary plate.

According to the mechanism, only by controlling the first driving device, a desired zooming operation of the optical apparatus can be accomplished automatically. Namely, there is no need of controlling respective movable plates, with the mechanism.

Also, according to the mechanism, because the first driving device is arranged inside the cutout of the movable plate, to design the optical apparatus thinner in the direction perpendicular to the direction of the optical axis is not hindered.

Also, according to the mechanism, both optical systems can be driven or actuated by the drive device equally and evenly.

Preferably, the first driving device comprises: a piezoelectric linear actuator which has: a lamination type of piezoelectric device which includes a plurality of piezoelectric elements that are laminated one over the other thereof in the direction parallel to the optical axis; and an engaging part which is fixed to one of ends in the direction parallel to the optical axis of the lamination type of piezoelectric device, wherein the engaging part frictionally engages a part of the one of the movable plates around the cutout, and the other of ends in the direction parallel to the optical axis of the lamination type of piezoelectric device is supported by the stationary plate, and an actuator-driving device which supplies a predetermined periodic voltage to the lamination type of piezoelectric device of the piezoelectric linear actuator so as to expand and contract the engaging part relative to the other of ends of the lamination type of piezoelectric device, so that there occurs a slide and no slide between the engaging part and the part of the one of the movable plates which causes an intermittent movement of the one of the movable plates relative to the stationary plate.

According to the mechanism, when the predetermined periodic voltage is supplied to the lamination type of piezoelectric device, the engaging part expands and contracts relative to the other of ends thereof, i.e., the engaging part vibrates minutely relative thereto in the direction parallel to the optical axis. Because the engaging part frictionally engages the part of the one of the movable plates, the one of the movable plates is driven relative to the stationary plate with the vibration of the engaging part.

The piezoelectric linear actuator has an ability to move the one of the movable plates relative to the stationary plate by a unit of very small distance accurately and at higher speed.

Also, with the piezoelectric linear actuator, it is possible to miniaturize the optical apparatus. That is, with the piezoelectric linear actuator, it is possible to make the optical apparatus thinner easily.

Preferably, the plurality of movable plates are positioned on one side of the stationary plate, wherein the pair of lens supporting parts project from both sides of each of the movable plates in which the both sides thereof are generally parallel with respect to the optical axis, and in which the pair of lens supporting parts are symmetrical with respect to a center line, parallel with the optical axis, of the movable plate, wherein the engaging part of the piezoelectric linear actuator has a pair of frictional holding part each of which extends in a direction generally perpendicular to a direction in which the piezoelectric elements are laminated one over the other, in which each of the frictional holding parts frictionally holds the part of the one of the movable plates around the cutout.

With the mechanism, it is easy to construct the optical apparatus so that the one of the movable plates and the lens supporting part are made integrally.

Also, with the mechanism, it is possible to assemble the plurality of movable plates, the lens supporting parts, and the piezoelectric linear actuator on the stationary plate in order, without turning the stationary plate over.

Accordingly, with the mechanism, it is possible to provide an optical apparatus with a pair of optical systems which is easy to assemble and simple in construction.

In accomplishing the above objects of the present invention, in another aspect thereof, there is provided a method for moving a pair of optical systems, having a pair of optical axes the one of which is parallel to the other thereof, along the optical axes, comprising the steps of: providing a plurality of movable plates one over the other on a base plate so that the plurality of movable plates can move relative to each other and relative to the base plate in a direction which is parallel to the optical axes;

providing a pair of lens on both sides of each of the movable plates so as to constitute the pair of optical systems on both sides of the movable plate; and moving each of the movable plates relative to the base plate by a predetermined distance.

In the method, the movable plates may comprise a first plate and a second plate, wherein the first plate is driven by a driving mechanism, and wherein the second plate is driven by the first plate.

In the method, the first plate and the second plate may have a common cutout inside which the driving mechanism is provided.

In the method, the driving mechanism may be provided between the pair of optical systems.

In the method, the driving mechanism may comprise an actuator which expands and contracts in the direction which is parallel to the optical axes, wherein one of a pair of ends of the actuator is fixed to one of the base plate and the first plate, and the other of the pair thereof frictionally engages the other of the base plate and the first plate.

In accomplishing the above objects of the present invention, in still another aspect thereof, there is provided an optical apparatus comprising: a pair of optical systems which are of a same type to each other, wherein the pair of optical systems produce a pair of images of a subject; a pair of image taking elements which take the pair of images of the subject which are produced by the pair of optical systems; and a moving mechanism which moves the pair of image taking elements in a direction, generally perpendicular to a direction of an optical axis of the optical system, in which the pair of image taking elements are moved oppositely by a desired distance to each other.

According to the mechanism, the pair of image taking elements are moved in the direction, generally perpendicular to the optical axis, in which the pair of image taking elements are moved oppositely; namely, the pair of image taking elements are moved toward each other or moved from each other.

With the movement of the image taking elements, the pair of images left and right which are taken by the pair of image taking elements are moved toward each other, or moved from each other. Namely, depending upon a distance between the optical apparatus and the subject, the directions or orientations of the pair of images left and right which are taken, can be freely changed with the pair of optical systems remaining stationary.

Therefore, regardless of the distance between the optical apparatus and the subject, a natural image can be obtained with the optical apparatus being simple in construction.

Preferably, each of the pair of image taking elements moves simultaneously by a same distance relative to a point, for example a central point, on a body of the optical apparatus, between the pair of image taking elements.

With the movement of the image taking elements, the pair of images left and right which are taken by the pair of image taking elements are moved toward each other, or moved from each other, simultaneously by the same distance.

Preferably, there is further provided a display device which displays the images of the subject which are taken by the pair of image taking elements.

In the mechanism, the pair of images of the subject which are taken by the pair of image taking elements, are displayed by the display device in such a suitable way that the pair of images are arranged right and left, or up and down, or overlapped one over the other.

With the mechanism, the viewer can adjust the pair of image taking elements properly so as to be able to gain an appropriate image of the subject in correct perspective, while he/she views the image on the display device. For instance, the positioning of the pair of image taking elements is so adjusted that the image of the subject, opposing a central front of the pair of optical systems, which are taken by the pair of the image taking elements, is displayed at a desired location, for example, at a center, on the display device.

Accordingly, the viewer can conveniently adjust the positioning of the pair of image taking elements while he/she is watching on the display device which displays a change, of the image of the subject, accompanying the operation of the moving mechanism.

More specifically, according to still another aspect of the present invention, the optical apparatus with the moving mechanism for moving the pair of image taking elements, for example, may be constructed as follows.

That is, the optical apparatus comprises: a pair of optical systems which are of a same type to each other, wherein the pair of optical systems produce a pair of images of a subject; a pair of image taking elements which take the pair of images of the subject which are produced by the pair of optical systems; a moving mechanism which moves the pair of image taking elements in a direction, generally perpendicular to a direction of an optical axis of the optical system, in which the pair of image taking elements are moved oppositely by a desired distance to each other; a stationary plate which extends in a direction parallel to the optical axis; a plurality of movable plates which are put one over the other thereof, wherein the movable plates are slidable relative to each other and relative to the stationary plate, in the direction parallel to the optical axis; a drive device for moving each of the plurality of movable plates relative to the stationary plate by a predetermined distance in the direction of the optical axis; and a pair of lens supporting parts which project from both sides of each of the movable plates, wherein the lens supporting part supports a lens group, wherein the pair of optical systems are provided on the both sides of the movable plates, wherein each of the pair of optical systems has by a plurality of the lens groups.

In the mechanism, the drive device may further comprise: a first driving device for moving one of the movable plates relative to the stationary plate in the direction parallel to the optical axis; and a second driving device for moving the other of the movable plates relative to the stationary plate in the direction parallel to the optical axis, in linkage with the movement of the one of the movable plates, wherein each of the movable members has a cutout which extends centrally in the direction parallel to the optical axis, and wherein the first driving device is provided in the cutout of the movable member where the first driving device is supported by the stationary plate.

In the mechanism, the first driving device may comprise: a piezoelectric linear actuator which has a lamination type of piezoelectric device which includes a plurality of piezoelectric elements that are laminated one over the other thereof in the direction parallel to the optical axis and an engaging part which is fixed to one of ends in the direction parallel to the optical axis of the lamination type of piezoelectric device, wherein the engaging part frictionally engages a part of the one of the movable plates around the cutout, and the other of ends in the direction parallel to the optical axis of the lamination type of piezoelectric device is supported by the stationary plate, and an actuator driving device which supplies a predetermined periodic voltage to the lamination type of piezoelectric device of the piezoelectric linear actuator so as to expand and contract the engaging part relative to the other of ends of the lamination type of piezoelectric device, so that there occurs a slide and no slide between the engaging part and the part of the one of the movable plates which causes an intermittent movement of the one of the movable plates relative to the stationary plate.

In the mechanism, the plurality of movable plates may be positioned on one side of the stationary plate, wherein the pair of lens supporting parts project from both sides of each of the movable plates in which the both sides thereof are generally parallel with respect to the optical axis, and in which the pair of lens supporting parts are symmetrical with respect to a center line, parallel with the optical axis, of the movable plate, wherein the engaging part of the piezoelectric linear actuator has a pair of frictional holding part each of which extends in a direction generally perpendicular to a direction in which the piezoelectric elements are laminated one over the other, in which each of the frictional holding parts frictionally holds the part of the one of the movable plates around the cutout.

BRIEF DESCRIPTION OF THE DRAWINGS

These and other objects and features of the present invention will become clear from the following description taken in conjunction with a preferred embodiment thereof with reference to the accompanying drawings in which.

DETAILED DESCRIPTION OF THE PREFERRED EMBODIMENT

Figure 1:
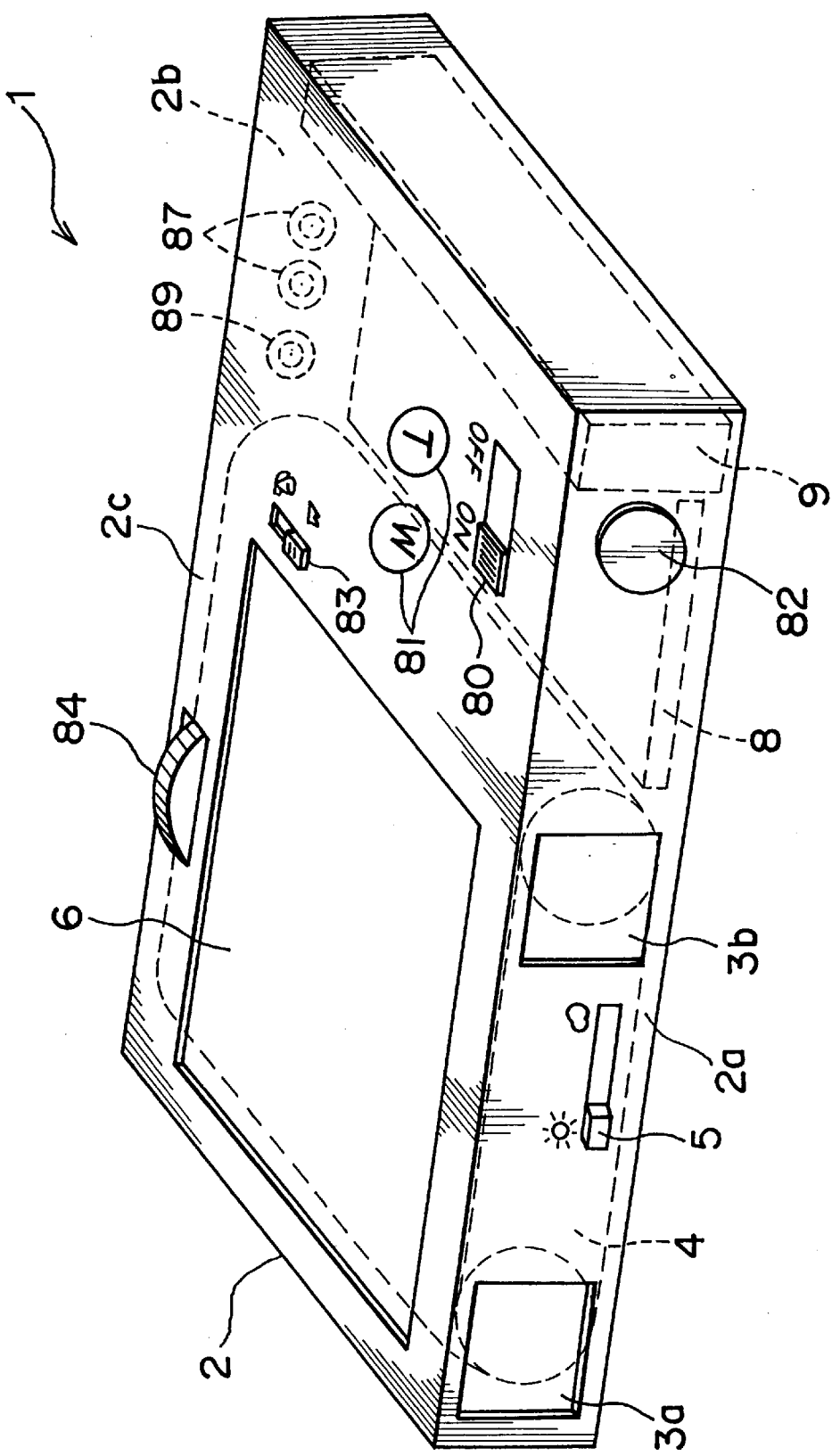
FIG. 1 is a perspective view showing a stereoscopic camera according to an embodiment of the present invention.

Before the description of the present invention proceeds, it is to be noted that like parts are designated by like reference numerals throughout the accompanying drawings.

Referring to FIGS. 1 through 12, a detailed description is made below on a stereoscopic camera, as an optical apparatus, according to a preferred embodiment of the present invention.

FIG. 1 is a general perspective view of the stereoscopic camera of the embodiment. As shown in FIG. 1, the stereoscopic camera 1 has a housing 2 which is thin and rectangular solid in shape. On a narrow and long side 2a of the housing 2, there are arranged a pair of photographing windows or image taking windows 3a and 3b, an exposure adjusting lever 5, and a shutter button 82. On the other side 2b of the housing 2, there are arranged a pair of video output terminals 87 and a serial output terminal 89. On an upper surface 2c of the housing 2, there are arranged a liquid crystal monitor 6 on which an image being taken is displayed, a main switch 80, a zoom switch 81 for a zooming operation, a focusing operation lever 83, and a shift operation dial 84 for adjusting its parallax.

The housing 2 accommodates an optical unit 4 which has a pair of optical systems being positioned so that they face the image taking windows 3a and 3b, a circuit substrate 8 which includes an operational control circuit and a flash memory, etc., and a charging battery 9.

Amount of light which is received by a CCD element 90, of the optical unit 4, that will be described later, can be adjusted by sliding the exposure adjusting lever 5 leftward as shown in FIG. 1 and by inserting an exposure adjusting ND filter (not shown in FIG. 1) into a space positioned in front of the optical unit 4.

Figure 2:
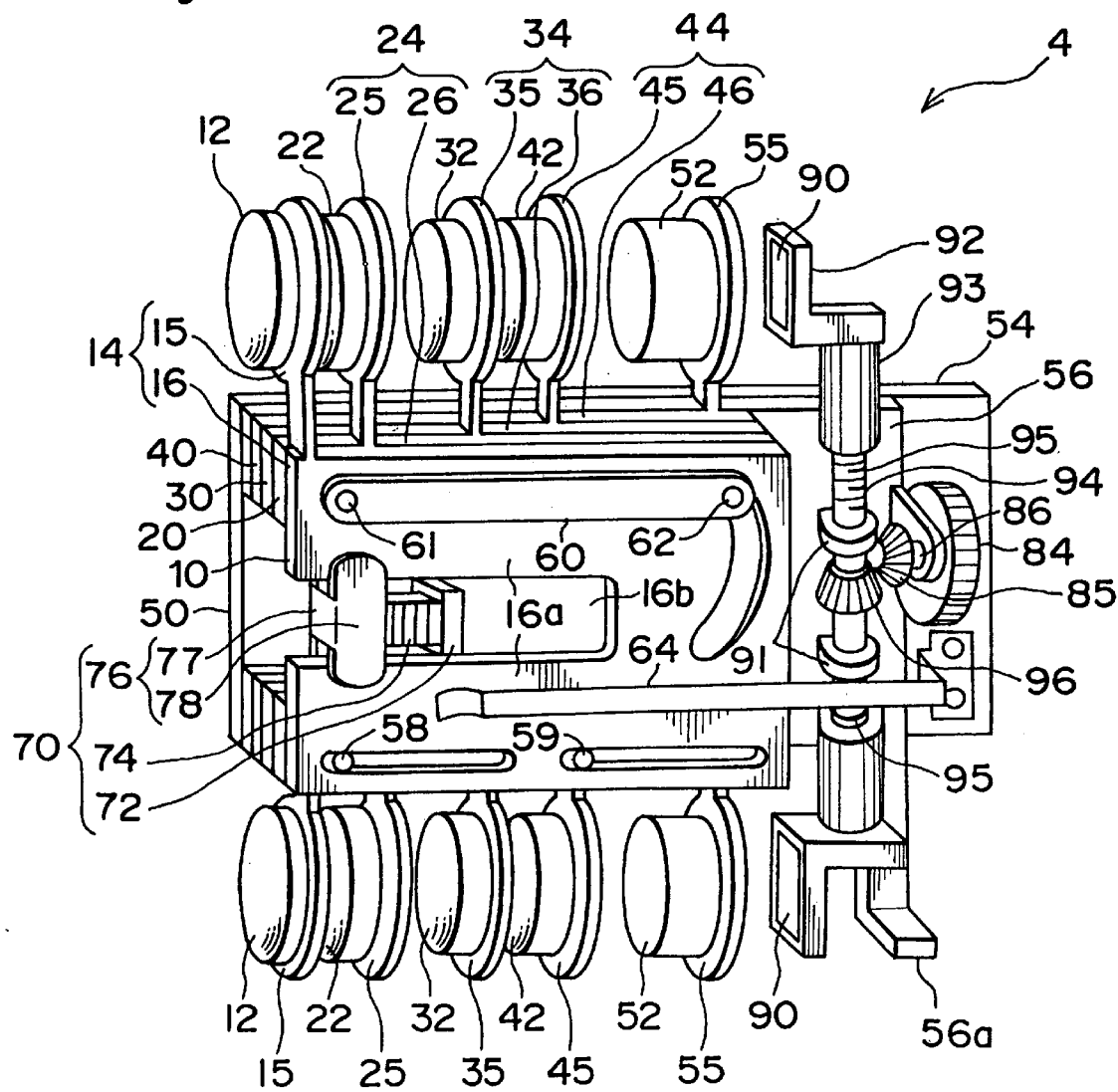
FIG. 2 is a perspective view showing an optical unit of the stereoscopic camera shown in FIG. 1.
Figure 3:
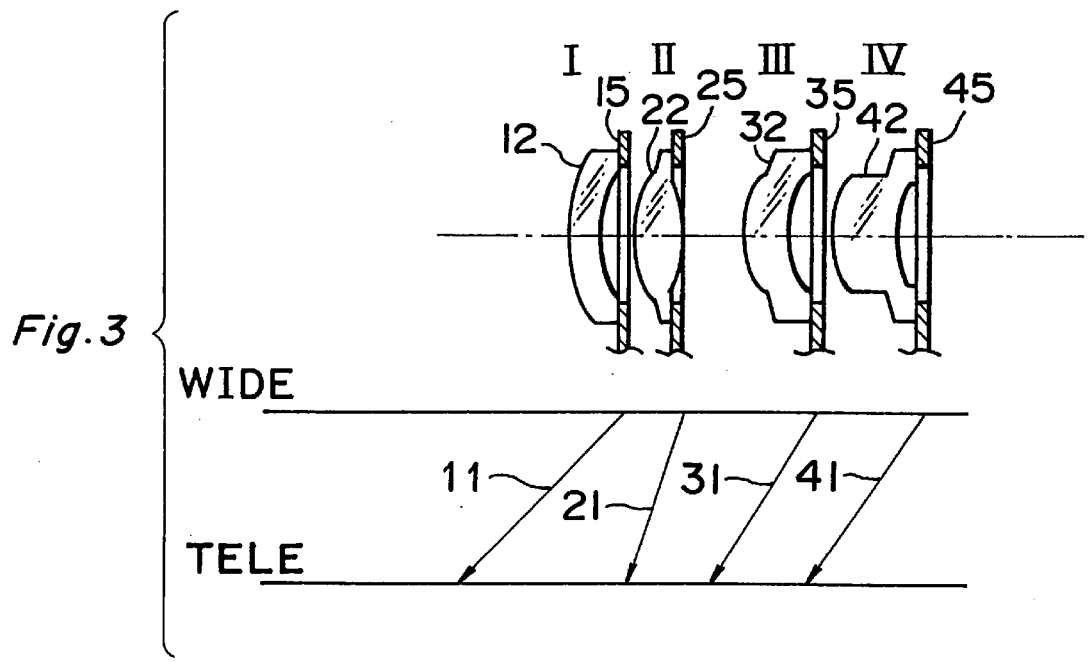
FIG. 3 is an explanatory view showing an optical system shown in FIG. 2.

As shown in FIG. 2 which is a perspective view of the optical unit 4 of a stereoscopic camera shown in FIG. 1, the optical unit 4 has a pair of optical systems one of which is of the same type as that of the other thereof.

Namely, the optical unit 4 has a first unit 10 which includes a pair of first lens groups 12 and 12, and a first cam plate 16 which is fixed to the pair of first lens groups 12 and 12; a second unit 20 which includes a pair of second lens groups 22 and 22, and a second cam plate 26 which is fixed to the pair of second lens groups 22 and 22; a third unit 30 which includes a pair of third lens groups 32 and 32, and a third cam plate 36 which is fixed to the pair of third lens groups 32 and 32; a fourth unit 40 which includes a pair of fourth lens groups 42 and 42, and a fourth cam plate 46 which is fixed to the pair of fourth lens groups 42 and 42; and a base unit 50 which includes a pair of low-pass filters 52 and the CCD element 90.

The first, second, third and fourth cam plate 16, 26, 36 and 46 are put one over the other relative to the base unit 50.

In the arrangement, the pair of optical systems with the first through fourth lens groups 12, 22, 32, 42; 12, 22, 32, 42 are synchronously driven by a driving mechanism including the first, second, third and fourth cam plates 16, 26, 36 and 46.

As apparent from the above explanation, each of the pair of optical systems is a four lens group zooming optical system which has the first through fourth lens groups 12, 22, 32 and 42, and each of the first through fourth lens groups 12, 22, 32 and 42 has one or more lenses. Each of the first through fourth lens groups 12, 22, 32, and 42 is driven, according to each of zooming curves 11, 21, 31, and 41, respectively, shown in FIG. 3.

As shown in FIG. 2, the first through fourth units 10, 20, 30, and 40 also include a pair of first through fourth lens supporting portions 15, 25, 35 and 45; 15, 25, 35 and 45 which are connected to the first through fourth sheet-like flat cam plates 16, 26, 36 and 46, respectively, so that the first through fourth lens supporting portions 15, 25, 35 and 45; 15, 25, 35 and 45 which are arranged in pair on both sides, of the first through fourth sheet-like flat cam plates 16, 26, 36 and 46 respectively, which are parallel with a pair of optical axes of the optical unit 4, are symmetrical relative to a center line, parallel to the optical axis, of the first through fourth sheet-like flat cam plates 16, 26, 36 and 46.

Therefore, in the arrangement, the first unit 10 includes the pair of first lens supporting members 14 and 14 each of which has the first cam plate 16 and the first lens supporting portion 15 being fixed to the first cam plate 16; the second unit 20 includes the pair of second lens supporting members 24 and 24 each of which has the second cam plate 26 and the second lens supporting portion 25 being fixed to the second cam plate 26; the third unit 30 includes the pair of third lens supporting members 34 and 34 each of which has the third cam plate 36 and the third lens supporting portion 35 being fixed to the third cam plate 36; and the fourth unit 40 includes the pair of fourth lens supporting members 44 and 44 each of which has the fourth cam plate 46 and the fourth lens supporting portion 45 being fixed to the fourth cam plate 46.

The first through fourth lens supporting portions 15, 25, 35, and 45 support the first through fourth lens groups 12, 22, 32, and 42, respectively.

The base unit 50 has a flat fixing plate 54 and a focusing plate 56 slidably arranged on the fixing plate 54. A pair of low-pass filter supporting portions 55 and 55 which support a pair of low-pass filters 52 and 52, project from both sides, extending along the optical axis, of the focusing plate 56. On a rear, upper side of the focusing plate 56, there is installed a supporting mechanism for supporting the pair of CCD elements 90 and 90, which are explained later.

As shown in FIG. 2, the first through fourth cam plates 16, 26, 36, and 46 of the first through fourth lens supporting members 14, 24, 34, and 44; 14, 24, 34 and 44 are positioned one over the other from the top down in this order; namely, the first cam plate 16, the second cam plate 26, the third cam plate 36 and the fourth cam plate 46 are placed from top down onto the focusing plate 56.

The uppermost first cam plate 16 is urged or biased by one end of a bar spring 64 the other end of which is fixed to the flat fixing plate 54. With this arrangement, the first through fourth cam plates 16, 26, 36 and 46, and the focusing plate 56 are biased against the fixing plate 54.

The first through fourth cam plates 16, 26, 36, and 46, and the focusing plate 56 slide relative to each other; thus, they move along the optical axis relative to the fixing plate 54 respectively to perform a zooming operation.

Figure 5:
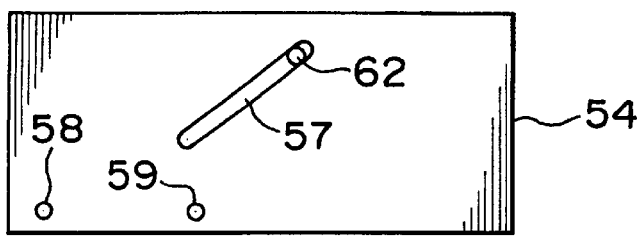
FIG. 5 is a plan view showing a fixing plate which is used in the optical unit shown in FIG. 2.

That is, as shown in FIG. 5, the fixing plate 54 has a cam hole 57, and a pair of fixing pins 58 and 59 projecting at a right angle with respect to a surface thereof.

Figure 6:
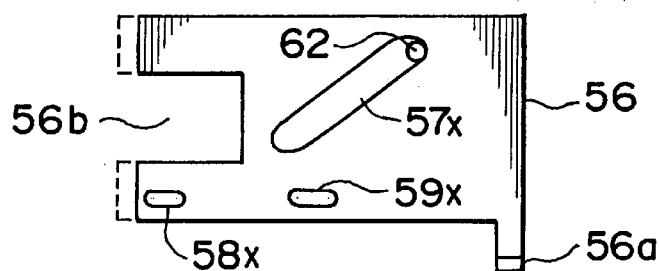
FIG. 6 is a plan view showing a focusing plate which is used in the optical unit shown in FIG. 2.

Meanwhile, as shown in FIG. 6, the focusing plate 56 has an escaping hole 57x penetrating therethrough and a pair of guide holes 58x and 59x. The focusing plate 56 has a projection 56a projecting from a rear end thereof at a right angle with respect to a surface thereof, and an end of the projection 56a engages the focusing operation lever 83 as shown in FIG. 1.

Figure 7:
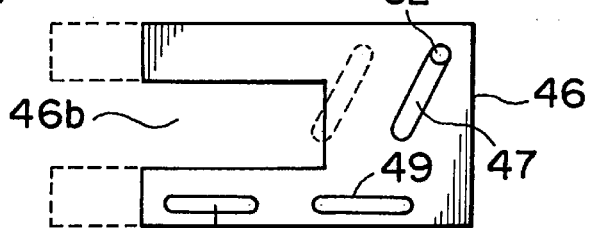
FIG. 7 is a plan view showing a cam plate (i.e. a movable plate) which is used in the optical unit shown in FIG. 2.

Meanwhile, as shown in FIG. 7, the fourth cam plate 46 of the fourth lens supporting member 44 has three grooves penetrating therethrough. That is, the fourth cam plate 46 has a cam hole 47, and a pair of guide holes 48 and 49.

Figure 8:
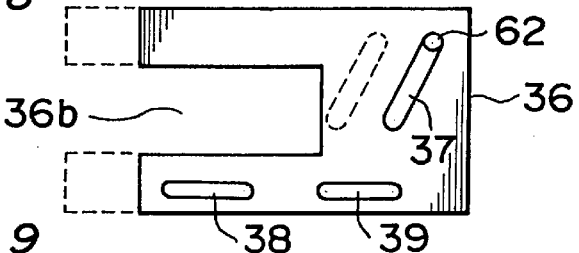
FIG. 8 is a plan view showing a cam plate (i.e. a movable plate) which is used in the optical unit shown in FIG. 2.

Meanwhile, as shown in FIG. 8, the third cam plate 36 of the third lens supporting member 34 has three grooves penetrating therethrough. That is, the third cam plate 36 has a cam hole 37, and a pair of guide holes 38 and 43.

Figure 9:
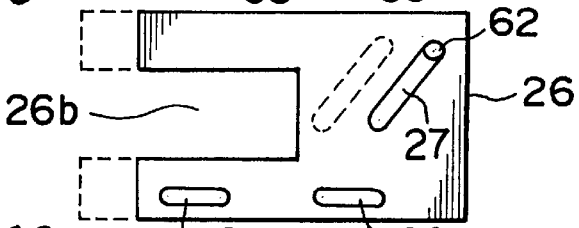
FIG. 9 is a plan view showing a cam plate (i.e. a movable plate) which is used in the optical unit shown in FIG. 2.

Meanwhile, as shown in FIG. 9, the second cam plate 26 of the second lens supporting member 24 has three grooves penetrating therethrough. That is, the second cam plate 26 has a cam hole 27, and a pair of guide holes 28 and 29.

Figure 10:
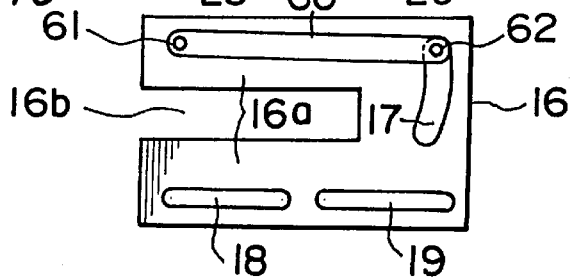
FIG. 10 is a plan view showing a cam plate (i.e. a movable plate) which is used in the optical unit shown in FIG. 2.

Meanwhile, as shown in FIG. 10, the first cam plate 16 of the first lens supporting member 14 has three grooves penetrating therethrough. That is, the first cam plate 16 has an escaping hole 17, and a pair of guide holes 18 and 19.

Each of the pair of fixing pins 58 and 59 of the fixing plate 54 is slidably inserted into and engages each of the guide holes 58x and 59x of the focusing plate 56, each of the guide holes 48 and 49 of the fourth cam plate 46, each of the guide holes 38 and 39 of the third cam plate 16, each of the guide holes 28 and 29 of the second cam plate 26, and each of the guide holes 18 and 19 of the first cam plate 16.

With the arrangement, the focusing plate 56, the fourth cam plate 46, the third cam plate 36, the second cam plate 26, and the first cam plate 16, are so supported respectively by the fixing plate 54 that they can move linearly along the optical axis of the optical unit 4.

As shown in FIGS. 2 and 10, one end 61 of a lever member 60 is so fixed to an upper surface of the first cam plate 16 of the first lens supporting member 14 that the lever member 60 can pivot on the one end 61 of the lever member 60.

To the other end of the lever member 60, a guide pin 62 which projects towards the fixing plate 54 is fixed, so that the guide pin 62 of the lever member 60, penetrates through the escaping hole 17 of the first cam plate 16 of the first lens supporting member 14, slidably engages the cam hole 27 of the second cam plate 26, slidably engages the cam hole 37 of the third cam plate 36, slidably engages the cam hole 47 of the fourth cam plate 46, and slidably engages the cam hole 57 of the fixing plate 54.

Interlocking with the movement of the first cam plate 16, relative to the fixing plate 54, of the first lens supporting member 14 along the optical axis, the second cam plate 26, the third cam plate 36, and the fourth cam plate 46 are, respectively, moved relative to the fixing plate 54 along the optical axis with a state in which the first through fourth cam plates 16, 26, 36 and 46 are slidably put one over the other. The relative movements of the first through fourth cam plates 16, 26, 36 and 46 relative to the fixing plate 54, allow the first through fourth lens groups 12, 22, 32 and 42; 12, 22, 32, and 42 which are supported by the first through fourth lens supporting portions 15, 25, 35, and 45, respectively, to move relative to each other for a desired zooming operation.

The escaping hole 57x of the focusing plate 56 forms large enough to prevent the focusing plate 56 from interfering with the guide pin 62 of the lever member 60, and the escaping hole 57x thereof forms so that only the focusing plate 56 can be moved along the optical axis by sliding the focusing operation lever 83 as shown in FIG. 1.

With the arrangement, the CCD element 90, as shown in FIG. 2, is able to be moved so as to correspond or approach to a "distant" image forming position or a "near" image forming position, for the purpose of its focusing operation, by sliding the focusing operation lever 83.

As shown in FIGS. 6 through 10, the focusing plate 56 and the first through fourth cam plates 16, 26, 36 and 46 have, respectively, cut-outs 56b, 16b, 26b, 36b and 46b which all extend along the optical axis. Inside the cut-outs 56b, 16b, 26b, 36b and 46b of the focusing plate 56 and the first through fourth cam plates 16, 26, 36 and 46, a driving device 70 for driving the first cam plate 16 of the first lens supporting member 14 is positioned.

Figure 11:
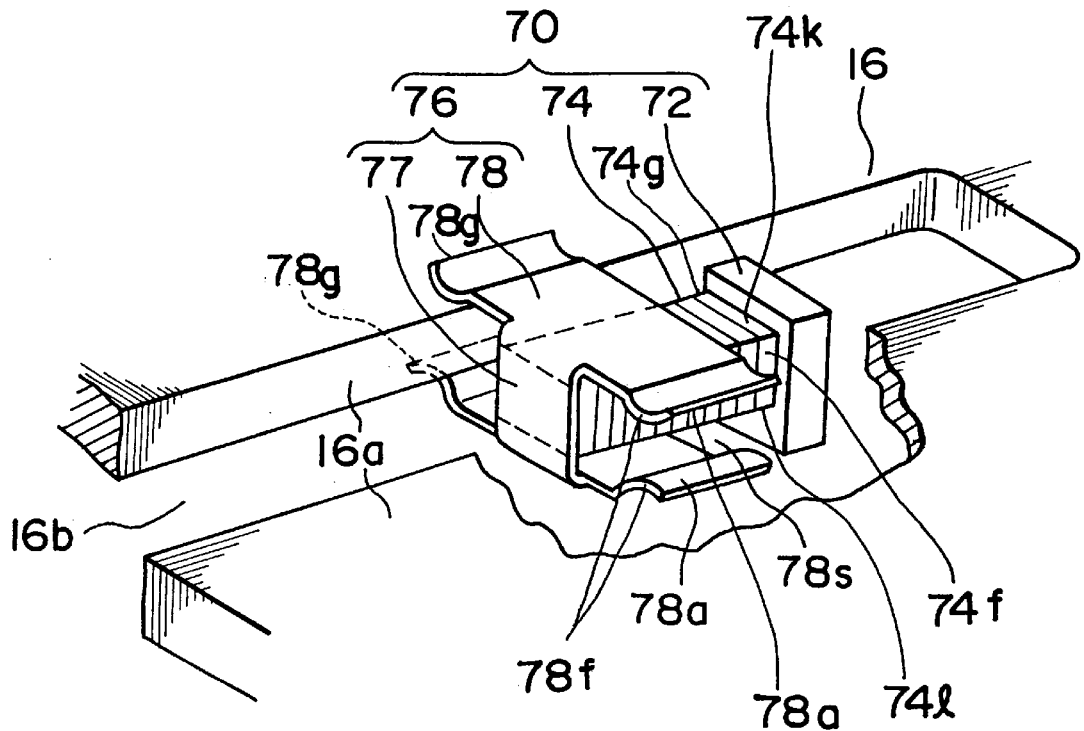
FIG. 11 is an enlarged, partly broken, perspective view showing a part of the optical unit shown in FIG. 2.

As shown in FIGS. 2 and 11, the driving device 70 is a piezoelectric linear actuator which comprises a laminated type of piezoelectric device 74, a fixing portion 72 which is fixed to one end of the piezoelectric device 74 in the direction of the lamination, and an engaging portion 76 which is fixed to the other end of the piezoelectric device 74 in the direction of the lamination. The driving device 70 is so arranged relative to the first cam plate 16 that the direction of lamination of a plurality of piezoelectric elements constituting the piezoelectric device 74 corresponds to the direction of the optical axis of the optical system. By the way, the direction of the optical axis of one, of the pair of optical systems, provided on one side of the first through fourth cam plates 16, 26, 36, 46, the focusing plate 56, and the fixing plate 54, is parallel to the direction of the optical axis of the other thereof provided on the other side thereof.

In the mechanism, the fixing portion 72 of the driving device 70 is fixed to the fixing plate 54. The piezoelectric device 74 and the engaging member 76 are supported by the fixing portion 72 like a cantilever; therefore, the piezoelectric device 74 and the engaging member 76 extend along the optical axis with the piezoelectric device 74 and the engaging member 76 floating from the fixing plate 54.

The piezoelectric device 74 is made of the plurality of piezoelectric elements, and the piezoelectric device 74 is so constructed that it expands and contracts in the direction in which the plurality of piezoelectric elements are laminated, upon application of a predetermined voltage thereto.

The engaging member 76 has a fixing portion 77 which is fixed to the other end of the piezoelectric device 74, and a pair of engaging portions 78 extending in a direction which is substantially perpendicular to both a surface of the fixing portion 77 and the optical axis, and which is along an upper surface 74k of the piezoelectric device 74 and a lower surface 74l thereof.

The pair of engaging portions 78 and 78 are formed by bending an upper side of the fixed portion 77 and a lower side thereof, respectively, as shown in FIG. 11. The engaging portions 78 and 78 project from both sides 74f, 74g, generally perpendicular to both the surface direction of the fixing portion 77 and the direction of the upper (or lower) surface 74k(74l) of the piezoelectric device 74, to form a pair of frictional engagement parts 78f and 78g.

Namely, a pair of engaging portions 78, 78 project on each side 74f and 74g of the piezoelectric device 74 to form the pair of frictional engagement parts 78f and 78g, and each frictional engagement part 78f and 78g has a pair of projections 78a and 78a which are curved inwardly to each other or face to each other, as shown in FIG. 11.

A peripheral portion 16a, positioned around the cutout 16b, of the first cam plate 16 of the first lens supporting member 14, is inserted into a pair of small-interval spaces which are formed or defined between the pair of projections 78a in each frictional engagement part 78f and 78g. With the insertion, each pair of projections 78a in each frictional engagement part 78f and 78g elastically pinch or hold the peripheral portion 16a of the first cam plate 16 from both surfaces thereof; thus, the pair of frictional engagement parts 78f and 78g of the driving device 70 frictionally engages the peripheral portion 16a of the first cam plate 16.

When a voltage, for example, having a sawteeth-shaped pulse, or a rectified full-wave-shaped pulse is applied to the piezoelectric device 74, the piezoelectric device 74 expands and contracts in a predetermined pattern, and the first lens supporting member 14 is moved quickly and accurately.

That is, when the projection 78a of the engaging member 76 of the driving device 70 moves slowly, the cam plate 16 moves together with the projection 78a relative to the fixing plate 54 with a frictional force exerting between the frictional engagement part 78f(78g) and the cam plate 16; accordingly, the first lens supporting member 14 is moved along the optical axis with respect to the fixing plate 54.

On the other hand, when the projection 78a moves rapidly or quickly, the force of inertia of the first unit 10 etc. becomes greater than the frictional force exerting between the frictional engagement part 78f(78g) and the cam plate 16. As a result, a sliding occurs therebetween. That is, the frictional engagement part 78f(78g) of the driving device 70 moves slidably relative to the cam plate 16, with the cam plate 16 being stationary with respect to the fixing plate 54.

Accordingly, the first lens supporting member 14 can be fed minutely intermittently forwards or backwards selectively, along the optical axis.

When a pulse voltage having a higher frequency is supplied to the piezoelectric device 74, there occurs sliding between the frictional engagement part 78f(78g), i.e. the projection 78a, of the driving device 70, and the cam plate 16. Even in this case, the cam plate 16 can be moved forwards or backwards by differentiating the length in forward sliding movement of the projection 78a relative to the first cam plate 16 and the length in backward sliding movement thereof relative thereto from each other.

Because the frictional engaging parts 78f and 78g, of the driving device 70 are positioned at both sides of the piezoelectric device 74, the moment acting on the piezoelectric device 74 on one side thereof which is caused by the frictional force exerting between one 78f(78g) of the frictional engaging parts and the cam plate 16 is equal to the moment acting thereon on the other side thereof which is caused by the frictional force exerting between the other 78g(78f) of the frictional engaging parts and the cam plate 16, and the directions of both moments are opposite to each other. Thus, both moments cancel each other. That is, no moment acts on the piezoelectric device 74. Accordingly, the driving device 70 can be driven stably.

When the first lens supporting member 14 is moved along the optical axis by the driving device 70, the second through fourth lens supporting members 24, 34, and 44 are moved respectively relative to the fixing plate 54 in association with the movement of the first lens supporting member 14, namely in association with the engagement between the guide pin 62 of the lever member 60, and each of the cam holes 27, 37, 47, and 57 of the second through fourth cam plates 26, 36, 46 and the fixing plate 54. At this time, the first through fourth lens supporting members 14, 24, 34, and 44 move smoothly along the fixing plate 54 without vibration, because they are biased toward the flat fixing plate 54 by the bar spring 64. Also, the pair of fixing pins 58 and 59 which project from the fixing plate 54, engage the pair of guide holes 18 and 19 of the first cam plate 16, the pair of guide holes 28 and 29 of the second cam plate 26, the pair of guide holes 38 and 39 of the third cam plate 36, and the pair of guide holes 48 and 49 of the fourth cam plate 46. Therefore, the cam plates 16, 26, 36 and 46 are guided linearly along the optical axis without vibration. Accordingly, the first through fourth lens groups 12, 22, 32 and 42 which are fixed to the first through fourth lens supporting portions 15, 25, 35 and 45, respectively, move along the optical axis for the zooming operation with high accuracy.

According to the above arrangement, the first through fourth lens supporting members 14, 24, 34 and 44 for driving the first through fourth lens groups 12, 22, 32 and 42; the fixing plate 54; and the focusing plate 56, are positioned and arranged between the pair of the first through fourth lens groups 12, 22, 32 and 42; 12, 22, 32 and 42 so that they extend in a radial direction of the lens groups 12, 22, 32 and 42. Therefore, it is possible to construct the optical unit 4 so that the sum in thickness of the first cam plate 16, the second cam plate 26, the third cam plate 36, the fourth cam plate 46, the focussing plate 56 and the fixing plate 54, which are arranged one over the other, is generally equal to or less than the diameter of the lens groups 12, 22, 32 and 42.

Accordingly, it is possible to realize a thin optical unit 4 which has the two optical systems and has a dimension that can be reduced as much as possible in the radial direction of the first through fourth lens groups 12, 22, 32 and 42.

On the other hand, as shown in FIG. 2, each of the pair of CCD elements 90 is supported by each of a pair of CCD element supporting members 92. Each CCD element supporting member 92 is screwed to each end of the shift screw rod 94 which is rotatably supported by the focusing plate 56. In the arrangement, the pair of CCD elements 90 move synchronously relative to each other in opposite directions which are perpendicular to the optical axis so that each CCD element 90 moves by the same amount of distance, when the shift screw rod 94 is rotated. Namely, when the shift screw rod 94 is rotated, the pair of the CCD elements 90 move synchronously relative to each other in a direction along which the CCD elements 90 approach to each other or along which the CCD elements 90 go away from each other by the same amount of distance.

That is, as shown in FIG. 2, a pair of supporting portions 91 are erected on the upper surface of the focusing plate 56, and the shift screw rod 94 extending in the direction perpendicular to the optical axis is rotatably supported by both of the supporting portions 91.

A male screw 95 is formed at both ends of the shift screw rod 94. A bevel gear 96 is fixed at a central part of the shift screw rod 94.

Figure 12:
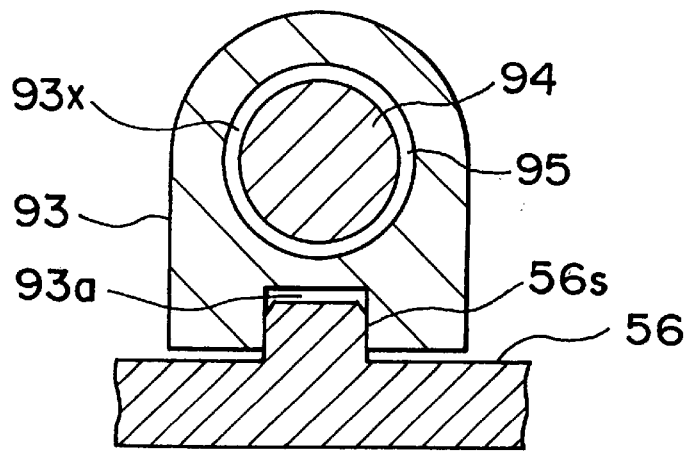
FIG. 12 is an enlarged sectional view showing a part of the optical unit shown in FIG. 2.

As shown in FIGS. 2 and 12, each CCD element supporting member 92 has a sleeve 93 inside which a female screw 93x is formed. The female screw 93x of the sleeve 93 engages the male screw 95 formed at each end of the shift screw rod 94.

A guide groove 93a is formed on a bottom surface of the sleeve 93, and a guide projection 56s is formed on an upper surface of the focusing plate 56.

With the arrangement, the sleeve 93 is guided in the direction perpendicular to the optical axis with a state in which the rotation of the sleeve 93 is prevented relative to the focusing plate 56.

A dial shaft 86 extending along the optical axis is rotatably supported on the upper surface of the focusing plate 56. A bevel gear 85 which engages the bevel gear 96 of the shift screw rod 94 is fixed to one end of the dial shaft 86. A shift operation dial 84 is fixed to the other end of the dial shaft 86. As shown in FIG. 1, a part of the shift operation dial 84 is exposed to the outside of the housing 2 of the stereoscopic camera 1.

With the arrangement, when the shift operation dial 84 is operated, the shift screw rod 94 is rotated; thus, the pair of CCD element supporting members 92 are fed in the opposite directions relative to each other, through the screws 95 and 93X. As a result, the CCD elements 90 are moved synchronously by the same amount of distance in the opposite directions which are perpendicular to the optical axis, thus changing the range of images to be taken of a subject.

Figure 4:
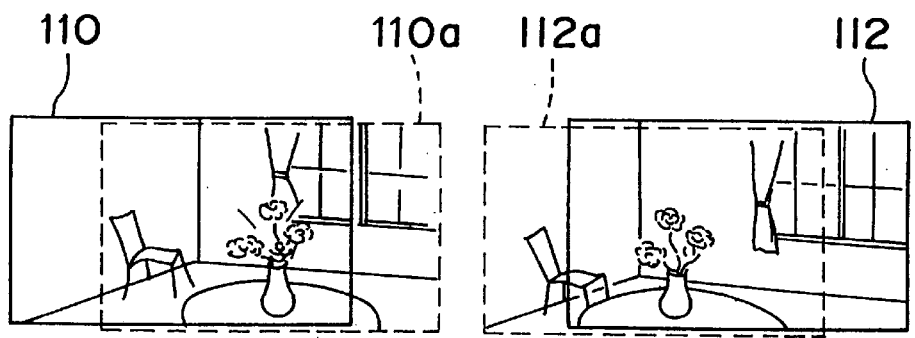
FIG. 4 is an explanatory view showing an image which is produced by the stereoscopic camera shown in FIG. 1.

That is, when the CCD elements 90 approach to each other, the images of the subject which are more deviated from each other are taken or photographed by the CCD elements 90, as shown by solid lines 110 and 112 in FIG. 4. On the other hand, when the CCD elements 90 depart from each other, the images of the subject which are less deviated from each other are taken or photographed by the CCD elements 90, as shown by chained lines 110a and 112a in the same figure. That is, the orientation of the right and left images of a particular subject can be changed, depending upon a distance between the particular subject and the stereoscopic camera 1.

Accordingly, it is possible to take or photograph an image with an appropriate parallax, which is adjustable according to the distance between the particular subject and the stereoscopic camera 1, by synchronously approaching the CCD elements 90 to each other or departing them from each other as explained above.

The viewer can operate the shift operation dial 84 while he/she views an image which is displayed on the liquid crystal monitor 6 in response to a signal which is outputted from the CCD elements 90. That is, the viewer, for example, can operate the shift operation dial 84 and adjust the parallax of images of the subject so that the image of the subject, positioning centrally in front of the pair of the photographing windows 3a and 3b, is displayed on a predetermined location (for example, a central part), with respect to a right and left direction, of the liquid crystal monitor 6.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical apparatus with a pair of optical systems, comprising:
    a stationary plate which extends in a direction parallel to an optical axis;
    a plurality of movable plates which are put one over the other thereof, wherein the movable plates are slidable relative to each other and relative to the stationary plate, in the direction parallel to the optical axis;
    a drive device for moving each of the plurality of movable plates relative to the stationary plate by a predetermined distance in the direction parallel to the optical axis;
    a pair of lens supporting parts which project from both sides of each of the movable plates, wherein the lens supporting part supports a lens group; and
    a pair of optical systems which are provided on the both sides of the movable plates, wherein each of the pair of optical systems has a plurality of the lens groups.

2. The optical apparatus as claimed in claim 1, in which the drive device comprises:
    a first driving device for moving one of the movable plates relative to the stationary plate in the direction parallel to the optical axis; and
    a second driving device for moving the other of the movable plates relative to the stationary plate in the direction parallel to the optical axis, in linkage with the movement of the one of the movable plates,
    wherein each of the movable members has a cutout which extends centrally in the direction parallel to the optical axis, and
    wherein the first driving device is provided in the cutout of the movable member where the first driving device is supported by the stationary plate.

3. The optical apparatus as claimed in claim 2, in which the first driving device comprises:
    a piezoelectric linear actuator which has:
        a lamination type of piezoelectric device which includes a plurality of piezoelectric elements that are laminated one over the other thereof in the direction parallel to the optical axis; and
        an engaging part which is fixed to one of ends in the direction parallel to the optical axis of the lamination type of piezoelectric device,
        wherein the engaging part frictionally engages a part of the one of the movable plates around the cutout, and the other of ends in the direction parallel to the optical axis of the lamination type of piezo electric device is supported by the stationary plate, and
    an actuator driving device which supplies a predetermined periodic voltage to the lamination type of piezoelectric device of the piezoelectric linear actuator so as to expand and contract the engaging part relative to the other of ends of the lamination type of piezoelectric device, so that there occurs a slide and no slide between the engaging part and the part of the one of the movable plates which causes an intermittent movement of the one of the movable plates relative to the stationary plate.

4. The optical apparatus as claimed in claim 3, in which the plurality of movable plates are positioned on one side of the stationary plate, wherein the pair of lens supporting parts project from both sides of each of the movable plates in which the both sides thereof are generally parallel with respect to the optical axis, and in which the pair of lens supporting parts are symmetrical with respect to a center line, parallel with the optical axis, of the movable plate, wherein the engaging part of the piezoelectric linear actuator has a pair of frictional holding part each of which extends in a direction generally perpendicular to a direction in which the piezoelectric elements are laminated one over the other, in which each of the frictional holding parts frictionally holds the part of the one of the movable plates around the cutout.

5. A method for moving a pair of optical systems, having a pair of optical axes the one of which is parallel to the other thereof, along the optical axes, comprising the steps of:

providing a plurality of movable plates one over the other on a base plate so that the plurality of movable plates can move relative to each other and relative to the base plate in a direction which is parallel to the optical axis;

providing a pair of lens on both sides of each of the movable plates so as to constitute the pair of optical systems on both sides of the movable plate; and moving each of the movable plates relative to the base plate by a predetermined distance.

6. The method as claimed in claim 5, in which the movable plates comprise a first plate and a second plate, wherein the first plate is driven by a driving mechanism, and wherein the second plate is driven by the first plate.

7. The method as claimed in claim 6, in which the first plate and the second plate has a common cutout inside which the driving mechanism is provided.

8. The method as claimed in claim 6, in which the driving mechanism is provided between the pair of optical systems.

9. The method as claimed in claim 6, in which the driving mechanism comprises an actuator which expands and contracts in the direction which is parallel to the optical axis, wherein one of a pair of ends of the actuator is fixed to one of the base plate and the first plate, and the other of the pair thereof frictionally engages the other of the base plate and the first plate.

10. An optical apparatus comprising:

a pair of optical systems which are of a same type to each other, wherein the pair of optical systems produce a pair of images of a subject;

a pair of image taking elements which take the pair of images of the subject which are produced by the pair of optical systems; and a moving mechanism which moves the pair of image taking elements in a direction, generally perpendicular to a direction of an optical axis of the optical system, in which the pair of image taking elements are moved oppositely by a desired distance to each other.

11. The optical apparatus as claimed in claim 10, each of the pair of image taking elements moves simultaneously by a same distance relative to a point, on a body of the optical apparatus, between the pair of image taking elements.

12. The optical apparatus as claimed in claim 10, which further comprises a display device which displays the images of the subject which are taken by the pair of image taking elements.

13. The optical apparatus as claimed in claim 10, which further comprises:

a stationary plate which extends in the direction parallel to the optical axis;

a plurality of movable plates which are put one over the other thereof, wherein the movable plates are slidable relative to each other and relative to the stationary plate, in the direction parallel to the optical axis;

a drive device for moving each of the plurality of movable plates relative to the stationary plate by a predetermined distance in the direction parallel to the optical axis; and a pair of lens supporting parts which project from both sides of each of the movable plates, wherein the lens supporting part supports a lens group, wherein the pair of optical systems are provided on the both sides of the movable plates, wherein each of the pair of optical systems has a plurality of the lens groups.

14. The optical apparatus as claimed in claim 13, in which the drive device comprises:

a first driving device for moving one of the movable plates relative to the stationary plate in the direction parallel to the optical axis; and a second driving device for moving the other of the movable plates relative to the stationary plate in the direction parallel to the optical axis, in linkage with the movement of the one of the movable plates, wherein each of the movable members has a cutout which extends centrally in the direction parallel to the optical axis, and wherein the first driving device is provided in the cutout of the movable member where the first driving device is supported by the stationary plate.

15. The optical apparatus as claimed in claim 14, in which the first driving device comprises:

a piezoelectric linear actuator which has:

a lamination type of piezoelectric device which includes a plurality of piezoelectric elements that are laminated one over the other thereof in the direction parallel to the optical axis; and an engaging part which is fixed to one of ends in the direction parallel to the optical axis of the lamination type of piezoelectric device, wherein the engaging part frictionally engages a part of the one of the movable plates around the cutout, and the other of ends in the direction parallel to the optical axis of the lamination type of piezo electric device is supported by the stationary plate, and an actuator driving device which supplies a predetermined periodic voltage to the lamination type of piezoelectric device of the piezoelectric linear actuator so as to expand and contract the engaging part relative to the other of ends of the lamination type of piezoelectric device, so that there occurs a slide and no slide between the engaging part and the part of the one of the movable plates which causes an intermittent movement of the one of the movable plates relative to the stationary plate.

16. The optical apparatus as claimed in claim 15, in which the plurality of movable plates are positioned on one side of the stationary plate, wherein the pair of lens supporting parts project from both sides of each of the movable plates in which the both sides thereof are generally parallel with respect to the optical axis, and in which the pair of lens supporting parts are symmetrical with respect to a center line, parallel with the optical axis, of the movable plate, wherein the engaging part of the piezoelectric linear actuator has a pair of frictional holding part each of which extends in a direction generally perpendicular to a direction in which the piezoelectric elements are laminated one over the other, in which each of the frictional holding parts frictionally holds the part of the one of the movable plates around the cutout.

* * * * *